July 30, 1968  S. H. APPLEBAUM ETAL  3,394,894
COMMINUTOR WITH VOLUMETRIC PROPORTIONED FEED
Filed March 31, 1966  10 Sheets-Sheet 1

INVENTORS
Sherman H. Applebaum
Frank H. Peterson
BY
George H. Baldwin
ATTORNEY

July 30, 1968     S. H. APPLEBAUM ET AL     3,394,894
COMMINUTOR WITH VOLUMETRIC PROPORTIONED FEED
Filed March 31, 1966     10 Sheets-Sheet 4

INVENTORS
Sherman H. Applebaum
Frank H. Peterson
BY
George H. Baldwin
ATTORNEY

FIG.12

United States Patent Office 3,394,894
Patented July 30, 1968

1

3,394,894
COMMINUTOR WITH VOLUMETRIC
PROPORTIONED FEED
Sherman H. Applebaum and Frank H. Peterson, Jacksonville, Fla., assignors to Diversified Products Mfg. Co., Jacksonville, Fla., a corporation of Florida
Filed Mar. 31, 1966, Ser. No. 539,001
10 Claims. (Cl. 241—101)

ABSTRACT OF THE DISCLOSURE

A feed apparatus including a volumetric proportioner above an endless and reversible conveyor belt with a hammer mill and a roller mill disposed adjacent opposite belt ends. A power driven feed auger moves the ground and mixed feed from the roller mill discharge to the hammer mill discharge which provides the discharge from the apparatus. Selective means are associated with the reversible belt power means driving the belt to adjust the rate of speed of the belt. Drive means connect the auger with the roller power means when such means also are drivingly connected to the roller grinding members. A two-part separated funnel is disposed above the roller mill with one part of the feed bypassing the mill and mixing with the other part passing through the mill adjacent the auger. A separator member is disposed along the belt and maintains the two feed parts separated thereon for depositing in respective portions of the funnel. The proportioner includes telescoping sections raisable and lowerable with respect to the belt by a rack and pinion.

This invention relates to feed apparatus, and more particularly to an improved apparatus for grinding, comminuting, mixing and blending dry flowable materials such as cereal grains and other components normally utilized in preparing animal feed rations.

Scientific feeding of livestock, such as poultry, cattle, hogs or other animals, requires the provision of a balanced feed ration. These rations are usually obtained by preparing and feeding several ingredients such as one or more cereal grains, feed supplements, concentrates, prepared feeds and/or premixed components. To insure the consumption of a balanced ration, feed conversion efficiency, and simplicity of handling, it is often desirable that the feed ration for animals be in ground or pulverized and thoroughly mixed form.

The cereal grains usually constitute the major portion of animal feed rations and are normally available in whole kernel form. Other desirable ingredients may be supplied to the animal feeder in granular or lump form. Proper preparation of feed rations thus usually requires grinding of part or all of the ingredients prior to or during the mixing and blending of the rations.

Various kinds of animals or animals of different ages usually require different feed rations. This requires that the livestock feeder, such as an individual farmer, be equipped to readily prepare two or more rations including varying proportions of different ingredients.

Accordingly, it is a general object of this invention to provide an improved mixing or blending and comminuting or grinding apparatus for preparing an accurate and complete ration from a plurality of feed components.

Particular objects of the invention are to provide an improved, compact, unitary, yet economical and simple apparatus for accurately providing the mixed ration from a plurality of feed components and which is readily selectable from one ration to another.

A specific object of the subject invention is to provide an improved blending and grinding apparatus capable of

2 unattended automatic operation which assures preparation of a complete predetermined ration at all times.

Another specific object of the instant invention is to provide an improved apparatus by which feed ingredients and/or other substances may be combined and blended to provide a homogeneous mixture of uniform consistency and desired nutriment.

A further specific object of the subject invention is to provide a feed mill which employs a conveyor belt for transmitting feed ingredients to the grinder and blender, and which is capable of combining individual ingredients of different characteristics into a mixture or mass in which the proportions are closely controlled and are uniformly homogeneous throughout the batch of the material prepared.

An additional specific object of the invention is to provide a conveyor belt type feed mill having individual units with controlled flow and a mixing and blending chamber into which each of the units is started and where thorough mixing and blending can be accomplished prior to discharge of contents of the mill.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Referring now in detail to the drawings the feed apparatus of this invention, being generally designated by reference numeral 10, comprises a volumetric proportioning and hopper section 12, including means for controlled and metered volumetric passage of feed ingredients to a conveyor and grinding section 14, which includes means for conveying the proportioned feed ingredients and for comminuting, grinding, mixing and blending the feed ingredients to obtain a homogeneous feed mixture of uniform consistency and desired nutriment. Hopper section 12 includes a frame 13 which supports a series of bins or hoppers 16, 18, 20, 22, 24 and 26 to which are supplied cereal grains, feed supplements, concentrates, prepared feeds and/or premixed other components which are used as ingredients in the preparation of the desired ground and mixed final feed ration. The feed apparatus 10 can be fabricated to employ any desired number of ingredient hoppers; the preferred embodiment shown containing a basic unit of four such hoppers 16, 18, 20 and 22, to which has been added an additional unit of two more hoppers 24 and 26. The hoppers 16 through 26 can be filled from above by gravity feed or from ground level by conventional means such as augers, conveyors and the like, and are provided with electrical receptacles 28 to supply such conventional means with a source of electrical power. Each electrical receptacle 28 is connected to and operable with a pressure plate type switch 30. When a hopper becomes substantially full with a feed ingredient, the feed will press against pressure plate 32 such that switch 30 will operate to break the electrical circuit to receptacle 28. This will in turn disable the auger, or other like means, being used to fill that particular hopper and prevent the same from overflowing. A shield 31 and deflector 33 are provided in each hopper to prevent the grain or other feed ingredient that is used to fill the hopper from lodging or building up behind pressure plate 32 and interfering with the operation of that plate and switch 30. Electrical receptacles 28 are connected by conduit and electrical conductors 34 to a main control panel 36 mounted on the front of the base section 14.

Conveyor and grinding section 14 includes an elongated frame 38 mounting a hammer mill 40 at one end thereof and a roller mill 42 at the opposite end thereof. A feed type auger or screw conveyor 44 connects the output of roller mill 42 to the output of hammer mill 40, so that the finished feed from either roller or hammer mill is gathered in a finished feed reservoir 46 located beneath the hammer mill 40. The final feed may be withdrawn from reservoir 46 by conventional means, such as a feed auger, from either front opening cover plate assembly 48 or rear opening cover plate assembly 50. To aid in the withdrawing of the finished feed and prevent dust and leakage, feed sock or dust cover 52 may be clamped around the auger employed in removing the finished feed. Conveyor and grinding section 14 further includes a reversible conveyor belt 54 (see FIGS. 6, 7 and 10) to convey the feed ingredients from the controlled volumetrically metered proportioner at the bottom of each ingredient hopper to either the hammer mill or the roller mill where they are ground and mixed.

Figures 10, 13:
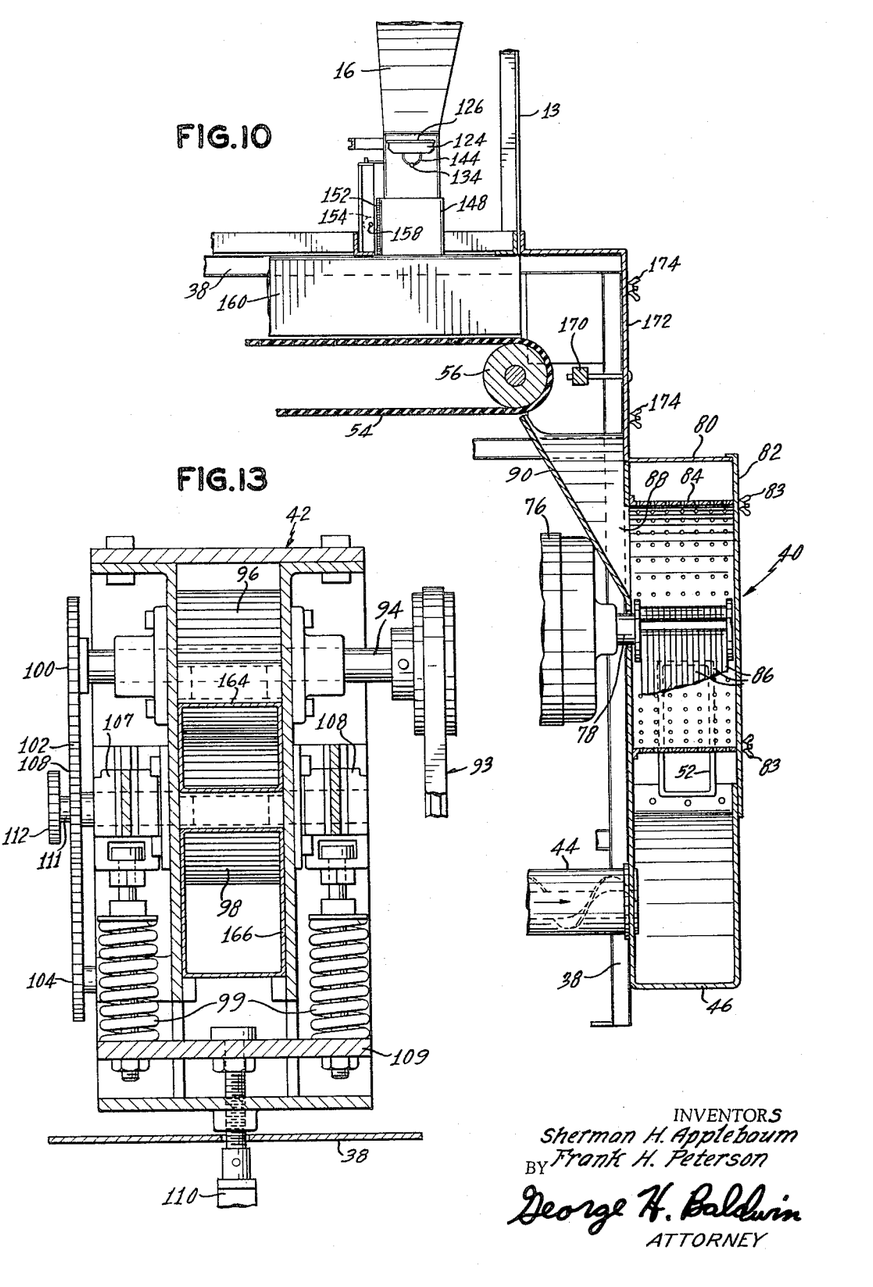
FIG. 10 is an enlarged partial cross-sectional view through the apparatus taken along line 10—10 of FIG. 4 showing details of the hammer mill.
FIG. 13 is an enlarged transverse sectional view through the apparatus along line 13—13 of FIG. 12.
Figure 11:
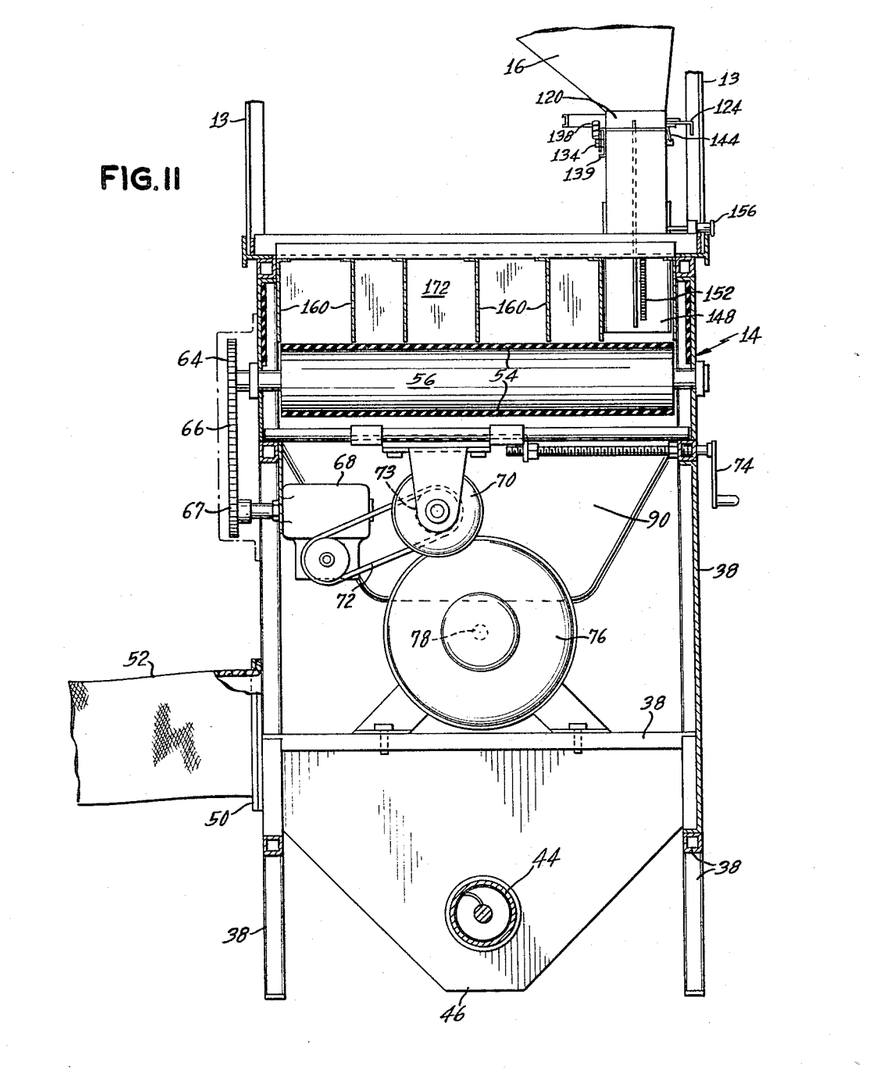
FIG. 11 is an enlarged partial cross-sectional view through the apparatus taken along line 11—11 of FIG. 2.
Figure 12:
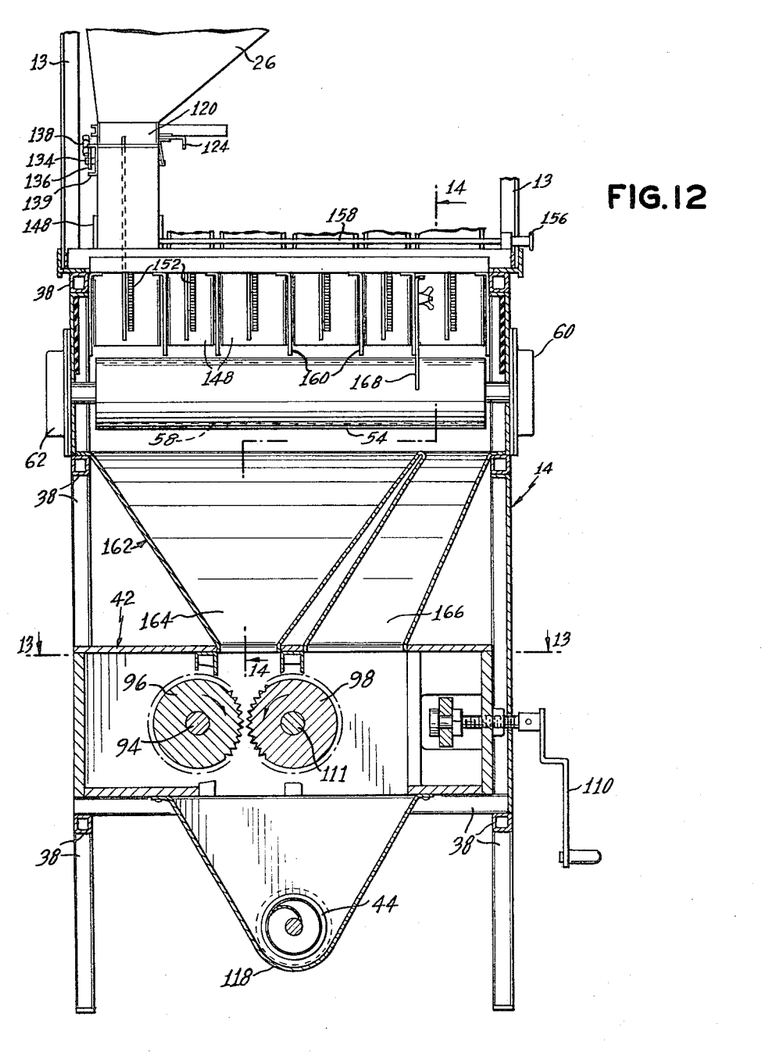
FIG. 12 is an enlarged partial cross-sectional view through the apparatus taken along line 12—12 of FIG. 2 showing details of the roller mill.

Conveyor belt 54 passes around roller 56 at one end of the apparatus, as shown in FIGS. 10 and 11, and around roller 58 at the opposite end thereof, as shown in FIG. 12. Adjustable means 60 and 62 are provided in conjunction with roller 58 to adjust the centering and tensioning of conveyor belt 54 such that the same remains aligned and taut at all times. Roller 56 is driven through sprocket 64, chain 66, sprocket 67 and gear reducer 68, which in turn is drivingly connected to a small reversible electric motor 70 by a V-belt 72 such that the conveyor belt 54 may move in either direction. Small electric motor 70 is slidably and adjustably mounted within frame 38 such that tension on the belt 72 between the motor 70 and gear reducer 68 may be varied, which in turn varies the speed at which conveyor belt 54 travels, see FIG. 11. The variable speed pulley 73 is adapted to permit the belt to assume various diameters around the pulley thereby to effectively increase and decrease the lineal speed of the belt 72 engaged within the pulley groove. When belt 72 becomes tensioned around pulley 73 the belt groove effectively contracts and belt 72 will traverse a smaller diameter of pulley 73 thereby decreasing the rate of speed of conveyor belt 54, and when the tension on belt 72 is reduced the belt groove of pulley 73 effectively expands and belt 72 will traverse a larger diameter of pulley 73 thereby increasing the rate of speed of the conveyor belt 54. By turning crank arm 74 in one direction electric motor 70 is positioned more closely adjacent gear reducer 68 and the tension on V-belt 72 is reduced such that conveyor belt 54 decreases in speed; if crank handle 74 is rotated in the opposite direction the distance between gear housing 68 and motor 70 is increased thereby increasing the tension on belt 72 to move the conveyor belt 54 at a more rapid rate.

Figure 1:
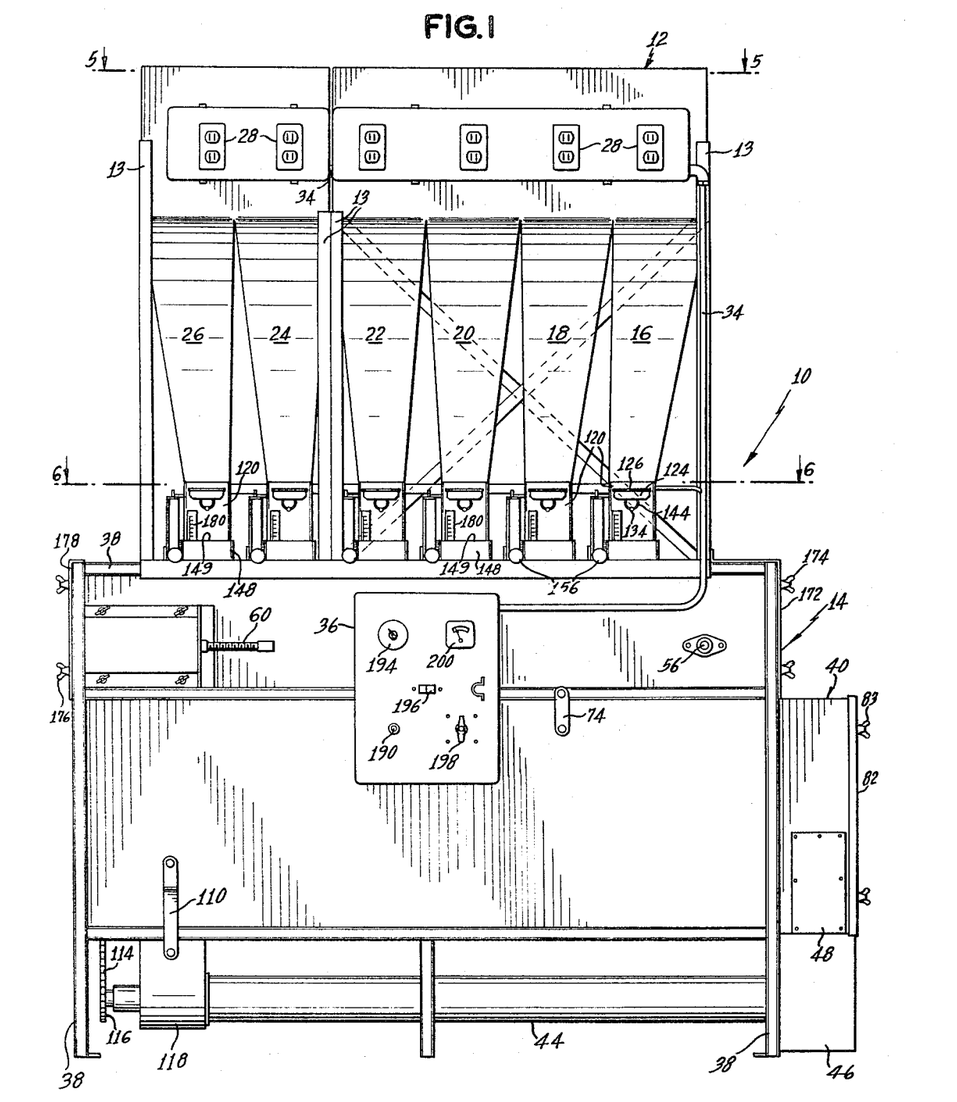
FIG. 1 is a front elevational view of the feed apparatus of the present invention.
Figure 2:
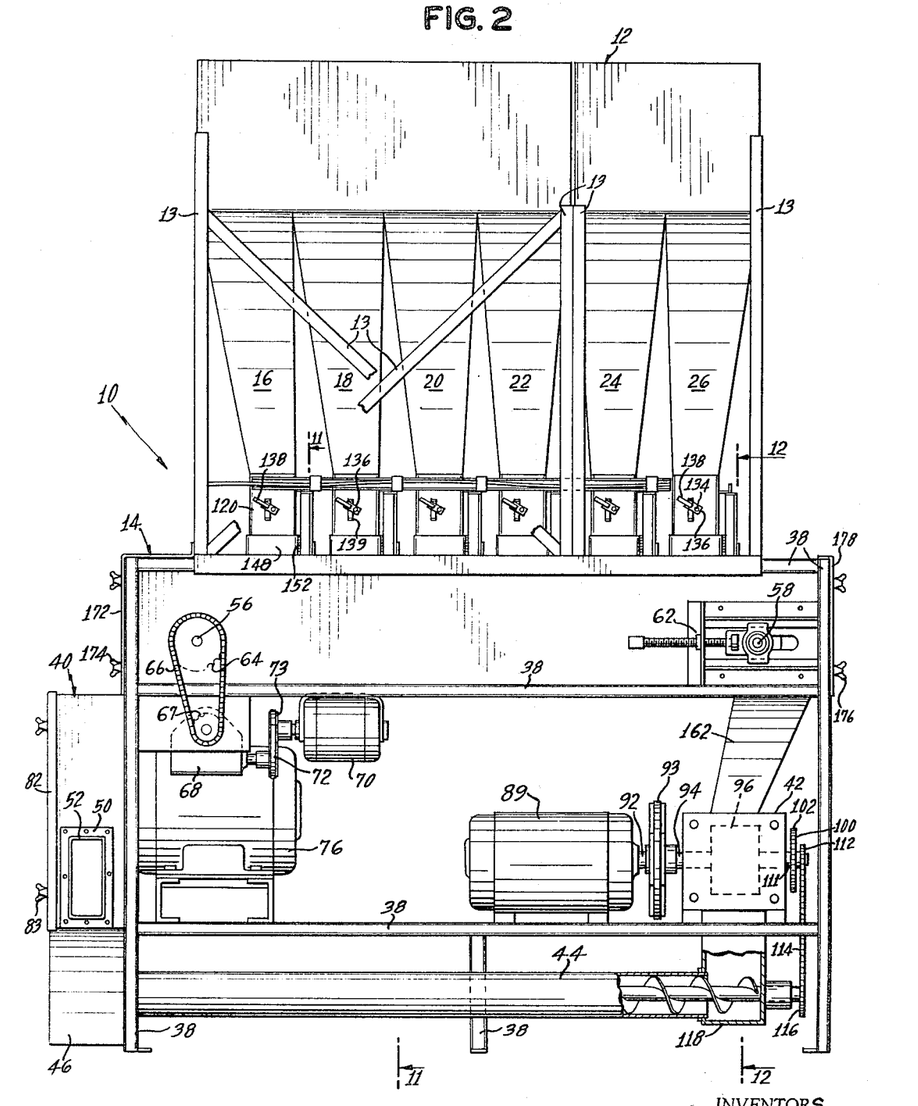
FIG. 2 is a rear elevational view of the feed apparatus of this invention; portions being broken away for clarity.
Figure 3:
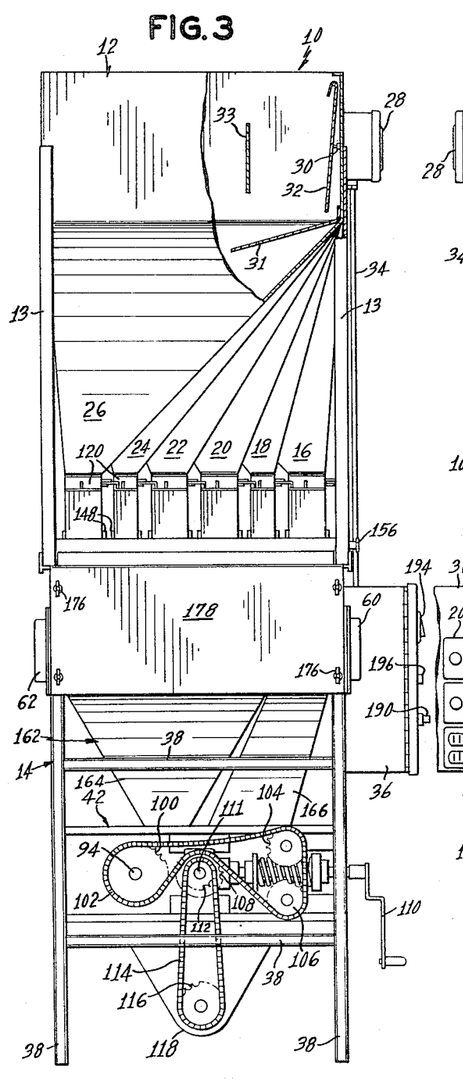
FIG. 3 is a left end view of the apparatus of FIG. 1 showing the roller mill, with portions being broken away.
Figure 4:
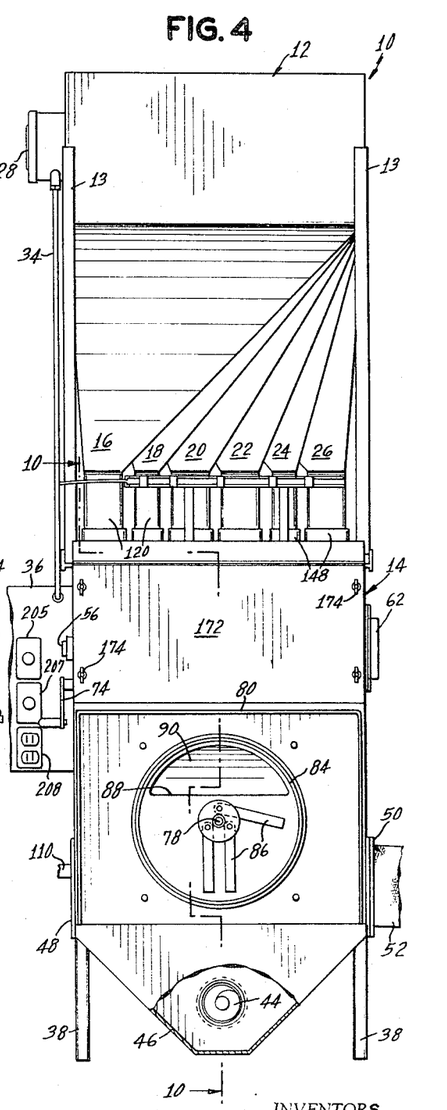
FIG. 4 is a right end view of the apparatus of FIG. 1 showing the hammer mill, with portions being broken away.

Mounted within frame 38 is a larger electric motor 76 (see FIG. 2), having an optimum size of between two and five horsepower in the embodiment depicted, the two horsepower being sufficient to operate the hammer mill when four hoppers are used and the five horsepower being used when the apparatus includes six hoppers. Motor 76 is drivingly connected to hammer mill 40 through shaft 78. The hammer mill 40 includes an exterior housing 80, having a removable side cover plate 82 attached by wing nuts 83, a perforated full circle screen 84 and a plurality of flailing hammers 86. The ingredients to be ground and blended into the final feed ration enter the hammer mill through side opening 88 after leaving conveyor belt 54 and passing over funnel-like guide pan 90.

Mounted within the opposite end of frame 38 is roller mill 42 which is drivingly connected to a two to three horsepower electric motor 89 through drive shaft 92, belt drive 93 and shaft 94. One roller mill member 96 is directly driven by shaft 94 and the other roller mill member 98 is driven by chain 102 driven by sprocket 100 attached to shaft 94 and connected to sprocket 108 attached to shaft 111 of roller mill member 98. A pair of idler sprockets 104 and 106 are rotatably mounted on one side of the frame of roller mill 42 to provide an appropriate chain path. Roller mill member 96 is fixed within the roller mill frame 42, while roller mill member 98 is yieldably mounted by adjustably movable journal boxes 107 and 108, and a pair of compression springs 99 connect the journal boxes 107 and 108 to a movable support member 109. Upon movement of support member 109 inwardly and outwardly coarseness or fineness of the feed ingredients ground by the roller mill can be selectively controlled and varied to obtain the desired end product. By turning crank arm 110 in one direction roller mill member 98 is moved more closely adjacent roller mill member 96, such that the ingredients passing therebetween will be more finely ground; should the crank arm 110 be turned in the opposite direction, member 98 will be moved away from member 96 such that the feed ingredients passing through the roller mill will be more coarsely ground. If a non-grindable foreign object is dropped from the conveyor belt 54 between roller members 96 and 98 roller member 98 will move outwardly against the forces of springs 99 to prevent substantial damage to the roller mill.

The auger 44 is driven from sprocket 108 connected to shaft 111 on which is mounted sprocket 112, and a chain 114 is connected between sprocket 112 and sprocket 116, sprocket 116 being drivingly connected to auger 44. That fed which has been ground and mixed collects at the bottom or discharge 118 of the roller mill and will be transferred through and by the feed auger 44 to the finished feed reservoir 46 at the bottom of the hammer mill 40.

Figure 5:
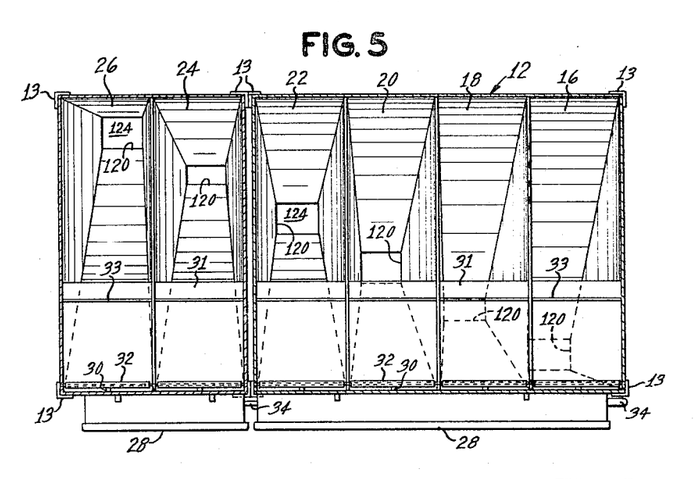
FIG. 5 is a transverse sectional view of the apparatus taken along line 5—5 of FIG. 1 showing the volumetric proportioning and hopper section.
Figure 6:
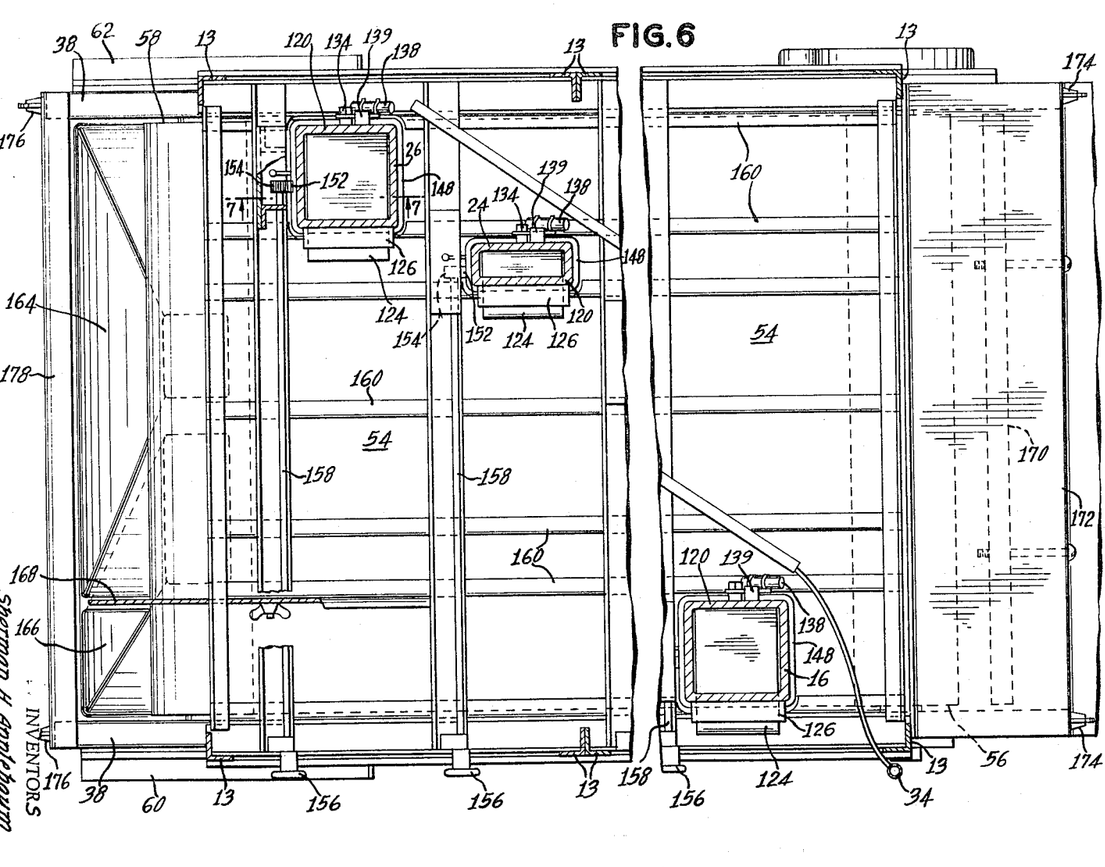
FIG. 6 is an enlarged partial transverse sectional view of the apparatus taken along line 6—6 of FIG. 1.
Figure 7:
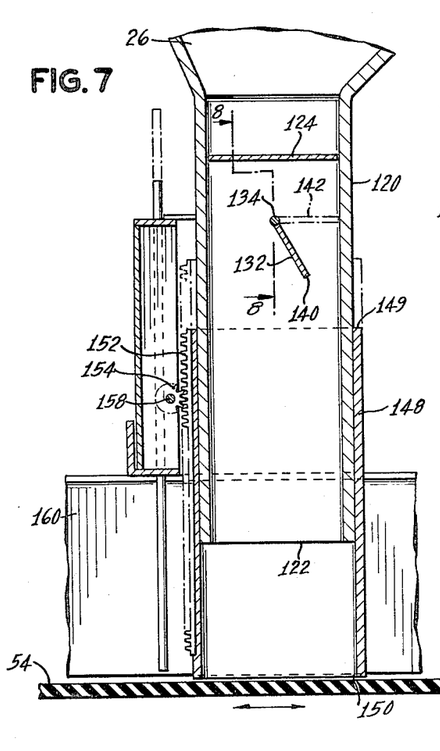
FIG. 7 is an enlarged cross-sectional view of the apparatus taken along line 7—7 of FIG. 6, showing the downspout portion of a hopper section thereof.
Figure 8:
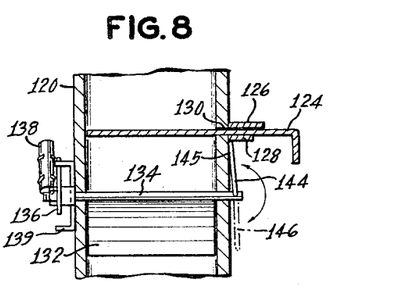
FIG. 8 is a cross-sectional view taken along line 8—8 of FIG. 7.

Each of the feed ingredient bins or hoppers 16 through 26 of section 12 terminates adjacent its lower section in a rectangular downspout portion 120 as shown in FIGS. 5, 6 and 7. Downspout 120 of each hopper 16 through 26 terminates in a lower end 122 spaced adjacently above the upper run of conveyor belt 54. Additionally, the downspout of each hopper opens onto the conveyor belt 54 in positions which are spaced transversely and longitudinally thereof, as depicted in FIGS. 5 and 6. Each downspout 120 is provided with a slide valve 124 which fits snuggly between the members 126 and 128 and through opening 130 within one side of the downspout. Slide valve 124 is operable to substantially prevent any of the feed ingredients flowing from the hopper above the downspout through the downspout. When the feed mill is in operation and a particular feed is desired, selective valve 124 may be completely removed from its respective downspout and hopper, but when the valve is in operative position closing off the downspout from use it will generally conform to the interior cross-sectional area of the downspout and prevent feed from flowing onto the conveyor belt 54.

Figure 9:
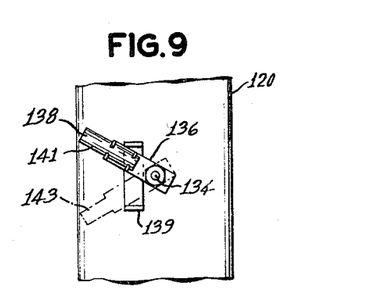
FIG. 9 is a rear elevational view of part of the downspout portion shown in FIG. 8.

Downspout 120 of each ingredient hopper 16 through 26 is provided with a positive shutdown or cutoff system to electrically stop operation of the entire feed apparatus should the feed ingredients fail to flow through their respective hopper and downspout. The system for each downspout includes a vane 132, extending across the interior of the downspout, mounted for pivotal movement about the longitudinal axis of a rod 134 extending through opposite walls of the downspout. Attached to one end of rod 134 is an arm 136 and a mercury switch 138. When the mill is operating properly with the feed ingredient passing through selective respective downspouts, vane 132 will normally assume the full line position 140 of FIG. 7 and mercury switch the full line position 141 of FIG. 9. Should the feed ingredients stop flowing through the respective downspout, for example, when the hopper is empty and is not being replenished, arm 136 and mercury switch 138 will pivot vane 132 to its cut-off position 142 of FIG. 7 and mercury switch to its cut-off position 143 of FIG. 9, whereby the mercury switch 138 will open the electrical circuit to cause stoppage of the operation of the entire feed apparatus, except that the electrical circuit is designed to permit continued operation of the roller mill or hammer mill for a predetermined time interval after stoppage of the remainder of the feed apparatus. Attached to the other end of rod 134 is a lock-out ring member 144 which may be swung upwardly into its lock-out position 145 and frictionally and resiliently secured under member 128 from its inoperative position at 146 to lock in its operative position the positive shutdown mechanism, as depicted by reference numerals 140 and 141 of FIGS. 7 and 9. When it is desired not to use one or more of the hoppers selective mercury switches attached to the downspouts of such hoppers are locked in their operative position by securing lock-out ring members in their lock-out positions thereby permitting the feed apparatus to be operated.

The downspout 120 of each respective feed ingredient hopper is provided with a rectangular closely fitting telescoping section 148 which fits around open end 122 thereof. Telescoping section 148 is movably adjustable over the lower portion of downspout 120 and the lower end thereof 150 may be adjusted from a position very closely spaced from reversible conveyor belt 54 to a height substantially above the belt by means of a rack 152 attached to one side of the telescoping section 148 and cooperating pinion 154 rotatively mounted within the frame 13 of hopper section 12. By adjusting the distance between lower end 150 of telescoping section 148 and conveyor belt 54 the amount of feed ingredient passing through the downspout from its respective hopper is controlled and volumetrically metered onto the moving feed belt 54. Pinion 154 is rotated by means of control knob 156 located adjacent the front of the feed apparatus and connecting rod 158 extending between knob 156 and pinion 154.

A number of elongated strip members such as at 160 extend longitudinally of conveyor belt 54 between respective downspouts and along the longitudinal outer sides of the mill. The lower edges of the members 160 are positioned above and closely adjacent conveyor belt 54 such as to maintain the individual feed ingredients on the conveyor belt separated one from the other while moving along the upper run of the belt 54.

Figure 14:
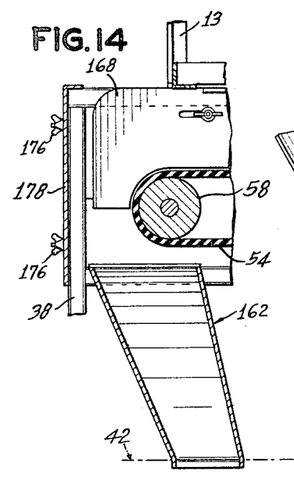
FIG. 14 is a partial cross-sectional view of the apparatus taken along line 14—14 of FIG. 12.
Figure 15:
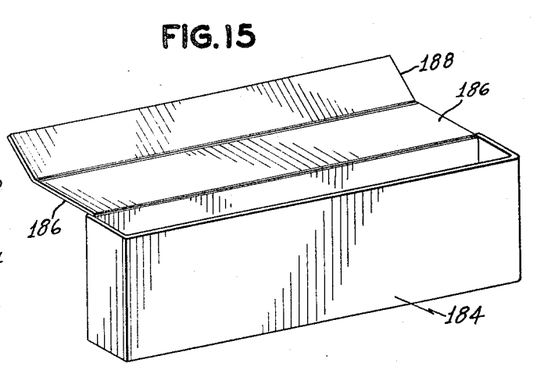
FIG. 15 is a perspective view of the sample collector or weight checking box usable with the apparatus.

The feed ingredients leaving conveyor belt 54 at roller end 58 pass to the roller mill 42 by means of a guide pan or funnel 162. Funnel 162 is divided into two sections 164 and 166, one section 164 directing the feed ingredients directly to the roller mill between roller members 96 and 98 where they are ground and then collected in receptacle 118 at the bottom of the roller mill, and section 166 directing one of the ingredients carried by the conveyor belt 54 to by-pass the roller members 96 and 98 and fall directly into the collecting receptacle 118. This type of split funnel is provided so that a concentrate, or another feed ingredient which may contain oil, molasses, syrup or other sticky substance, may be used as one of the ingredients in the final feed ration. The concentrate feed ingredient by-passes the roller members 96 and 98 to prevent gumming and sticking of the same thereby preventing roller mill jams and to increase the efficiency thereof. If a concentrate of this type is used as one of the feed ingredients, it is intended, in the embodiment shown, that the concentrate be employed with feed hopper 16 so that the concentrate is carried along the front edge of the conveyor belt 54 to be deposited within section 166 of the divided funnel and thereby by-pass the roller members 96 and 98 of roller mill 42. To aid in directing the concentrate into section 166 of the divided funnel from the conveyor belt 54, an adjustable shield member 168, as shown in FIGS. 12 and 14, is provided which is adjustably attached to one of the members 160 to properly locate same with respect to conveyor belt 54 and roll 58.

An elongated bar magnet 170 is provided closely adjacent the end of conveyor belt 54 which passes over roller 56, as shown in FIG. 10, to attract and retain any of the tramp metal which may be contained within the feed ingredients before the same reaches the hammer mill and thereby prevent damage to the same. Bar magnet 170 is mounted to plate member 172 which is in turn attached to the frame 38 of the feed mill by wing nuts 174. The magnet 170 and plate member 172 may be readily removed from the hammer mill end of the feed apparatus and employed at the roller mill end thereof adjacent conveyor belt roller 58. This is accomplished by removing wing nuts 176 located at the roller mill end of the machine, removing plate member 178, and then installing magnet 170 and its attached plate member 172 to the frame 38 after removal of plate member 178 which could then be attached to the frame 38 above the hammer mill.

Figure 17:
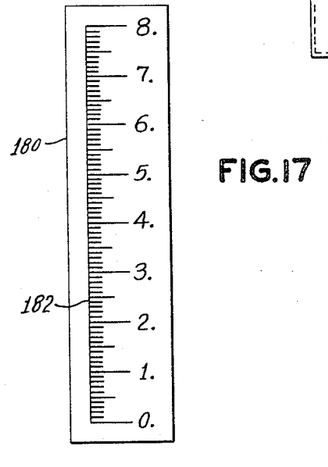
FIG. 17 is a front elevational view of a scale employed in the volumetric proportioning section of the apparatus.

The feed apparatus of this invention is provided with a plurality of scales 180, one of which is shown in FIG. 17, which are appropriately indexed at 182. The indicies 182 on the scales are made to correspond to numbers on a table supplied with the feed apparatus such that for any given index number a certain and corresponding weight (found in the table) of the particular feed ingredient being supplied will be deposited on the conveyor belt 54 during one complete revolution of the same. The scales 180 are respectively and appropriately attached to and in readable correlation with respective downspouts 120 such that the top edges 149 adjacent the front of the feed apparatus of the telescoping sections 148 will indicate the selected amount of feed ingredients from hoppers 16 to 26.

Figure 16:
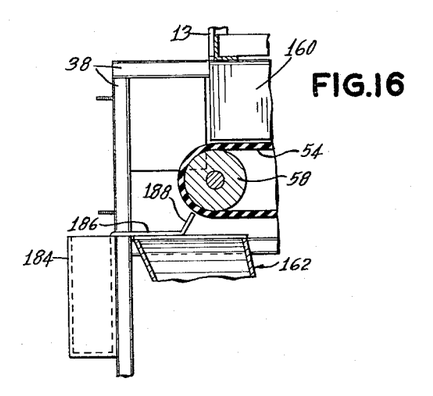
FIG. 16 is a view similar to FIG. 14 showing the manner of attachment of the sample collector of FIG. 15 to the apparatus.

When beginning any particular feed grinding and mixing operation with the feed apparatus of this invention the telescoping section 148, employed with each of the feed ingredient hoppers 16 through 26, which are to be used in this particular operation, will be adjusted using control knob 156 to the proper selected index 182 as shown by the top edge 149 of section 148, such that the amount of the feed ingredient issuing from lower edge 150 on to the conveyor belt 54 is in the desired appropriate proportion with relation to the other feed ingredients to be employed. To aid in determining the proper proportion of individual ingredients employed to the total feed mixture, a sampler box 184 is provided for weight checking the proportion of one or more of the individual ingredients obtained by one revolution of feed belt 54. The sampler box 184 has an extended upper side portion or shoulder 186 which terminates in an upwardly protruding lip 188 such that it may be fitted to the feed apparatus in close proximity to conveyor roller 58 of conveyor belt 54 after plate member 178 has been removed from the apparatus, as shown in FIG. 16.

Figure 18:
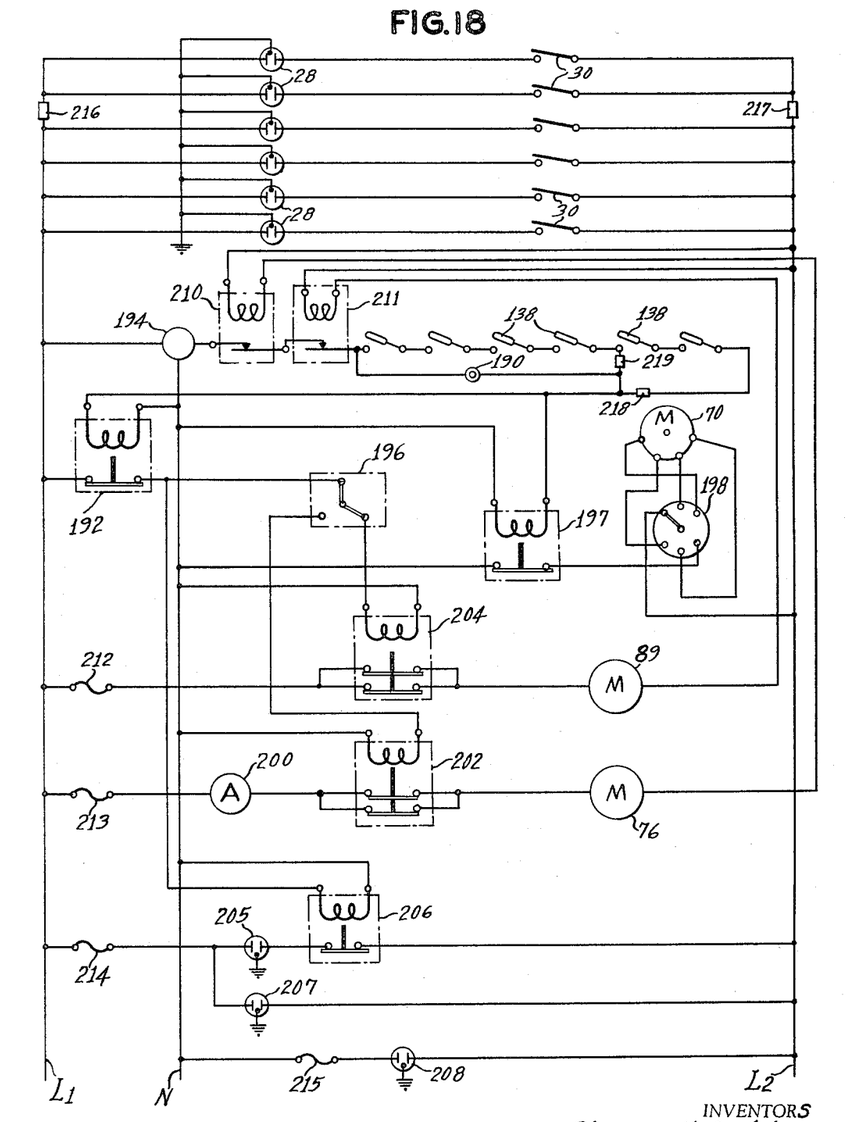
FIG. 18 is a diagrammatic view of the electrical circuit of the apparatus of this invention.

The electrical diagram is depicted in FIG. 18 and illustrates the power circuitry utilized in the feed mill. The circuit comprises a push-button on-off switch 190 which when closed by the operator of the feed apparatus overrides mercury switches 138. The operator maintains the push button switch 190 depressed to over-ride mercury switches 183 until such time as the feed in feed ingredient hoppers 16 through 26 flows through the downspouts to maintain mercury switches 138 in their upright positions. Should the flow of a feed ingredient through the downspouts be stopped for any reason the corresponding mercury switch will fall to open the circuit to stop the operation of the entire feed apparatus, except that the roller mill 42 or the hammer mill 40, will continue to operate for approximately 15 seconds by the action of time-delay relay 192, such that the feed within funnel 162 and the roller mill 42 will be cleared thereby preventing clogging and overloading on subsequent starting thereof. Mercury switches 138 are thus effective to prevent unnecessary or improper operation of the feed mill in the event one of the ingredients is exhausted or the flow is blocked. Of course, any of the mercury switches may be locked in their circuit completing condition as hereinabove described.

A timing device 194 is provided, mounted within control panel 36, so that the feed apparatus may be operated unattended at varying time periods and then shut off automatically as desired. Each hopper is provided with an electrical receptacle 28 and switch 30 in series therewith whereby auxiliary hopper augers and conveyors may be powered and controlled to fill the individual feed ingredient hoppers 16 through 26. When the ingredient hoppers become filled, micro switches 30 will be operated by their respective pressure plates to open the circuit to their respective electrical receptacles 28 whereby the auxiliary hopper augers will be shut off.

The electrical system is provided with a single pole double throw rocker switch 196 to control the operation of either of the hammer mill or roller mill double pole relays 202 and 204, as desired by the operator, switch 196 being in the position to operate the roller mill relay 204 and motor 92, as depicted in FIG. 18. A selector switch 198 controls the direction of the reversible conveyor motor 70 thereby controlling the forward and reverse directions of movement of the conveyor belt 54 for delivering the feed ingredients to either the hammer mill 40 or the roller mill 42. A single pole relay 197 is connected in circuit between time delay relay 192 and selector switch 198 which controls conveyor motor 70.

An ammeter 200 is connected in the hammer mill circuit so that the operator may view same and operate the hammer mill under optimum conditions without overload thereof, by adjusting crank arm 74 to increase or decrease the speed of the conveyor belt 54, as previously described, thereby adjusting the amount of feed being supplied to the hammer mill should the same be operating at overloaded or underloaded conditions.

A receptacle 205 is connected to the 220 volt, 60 cycle, single phase line voltage $L_1$ and $L_2$, and a single pole relay 206 is provided to activate and de-activate same upon operation of the feed apparatus, receptacle 205 being positioned on one side of control panel 36 to provide a power outlet for other equipment, such as the finish feed auger to be used in conjunction with the finish feed container 46.

Another 220 volt receptacle 207 and a 110 volt receptacle 208 are provided in the electrical circuit which are positioned on one side of the control panel 36 for supplying power to other auxiliary equipment which may be employed with the feed apparatus of this invention.

A pair of overload relays 210 and 211 are respectively connected in circuit with the hammer mill motor 76 and roller mill motor 92 which will open the power circuit upon overload of either motor 76 and 92 to cause the entire feed apparatus to cease operation. Appropriate fuses 212 and 215 are provided to prevent electrical damage to the entire circuit due to faults which may occur.

When all six hoppers are used on the basic apparatus, plug-in connections 216 and 217 are employed to connect the micro switches 30 and receptacles 28 to the power circuit and plug-in connector 218 is used to couple the two mercury switches 138 in circuit with the other four mercury switches 138 and plug-in connector 219 is disconnected, as is apparent from the consideration of the circuit diagram depicted in FIG. 18.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a feed apparatus the combination comprising an elongated frame having opposite end portions, an endless conveyor belt mounted to said frame for movement toward either of said end portions, volumetric proportioning means above said conveyor belt for volumetrically metering various feed ingredients onto said conveyor belt, selectively reversible power means for operating said conveyor belt in a forward direction toward one said end portion and in a reverse direction toward said other end portion, a hammer mill mounted to said frame adjacent said one end portion, a roller mill mounted to said frame adjacent said other end portion, passageways extending between the discharge ends of said conveyor belt and respective said mills, one said mill having a discharge opening through which ground and mixed finished feed may be removed therefrom, said discharge opening of said one mill constituting the discharge passage of the feed apparatus.

2. In the feed apparatus as defined in claim 1 wherein the other of said mills includes a discharge opening through which ground and mixed feed may be removed, and power means connected to said other mill for moving such ground and mixed feed from its said discharge opening to said discharge opening of said one mill.

3. In the feed apparatus as defined in claim 2 wherein said one mill is said hammer mill and said other mill is said roller mill, and wherein said power means includes a power driven feed auger connecting the discharge opening of said roller mill to the discharge opening of said hammer mill.

4. In the feed apparatus as defined in claim 1 further comprising selectively adjustable means for adjusting the rate of the speed at which said conveyor belt is driven thereby adjusting the amounts of various feed ingredients supplied to the selected said hammer or roller mills.

5. In the feed apparatus as defined in claim 3 wherein said roller mill includes a pair of rollers members, power means for driving said roller members, and drive means connecting said feed auger to said power means driving said roller members whereby said feed auger is operable upon operation of said power means to drive said roller members.

6. In the feed apparatus as defined in claim 5 further comprising a two-part separated funnel extending substantially between one said discharge end of said conveyor belt and said roller mill, said funnel being operative to direct a predetermined portion of the feed ingredients discharged from said conveyor belt through one part thereof and between said roller members and to by-pass oily feed concentrate through the other part thereof around said roller members of said roller mill, said roller members grinding the predetermined portion of the feed ingredients, and reuniting said predetermined portion with the oily feed concentrate below said roller members of said roller mill prior to removal from said roller mill discharge opening by said feed auger to said hammer mill discharge opening.

7. In the feed apparatus as defined in claim 6 further comprising a separator member extending longitudinally of the upper run of said conveyor belt and closely adjacent thereto to maintain the oily feed concentrate separated and apart from the other feed ingredients on said conveyor, said separator member extending outwardly from the roller mill discharge end of said conveyor belt and directing feed concentrate on said conveyor belt into said other part of said funnel to by-pass same during operation of said roller mill.

8. In the feed apparatus as defined in claim 1 wherein said volumetric proportioning means includes a plurality of feed ingredient hoppers, each said hopper having a lower section terminating in a downspout, each said downspout opening adjacently above said conveyor belt in a position which is transversely and longitudinally spaced from the adjacent downspout, each said downspout having a telescoping section around its open lower end, said telescoping section being adapted for movement from a position closely adjacent said conveyor belt to a position substantially above said conveyor belt, an elongated rack attached to each said downspout, a pinion engaged with and cooperative with each said rack to move said telescoping section toward and away from said conveyor belt, an operating rod extending transversely of said conveyor belt and connected to each said pinion adjacent the rearward end of respective said rod, and a control knob connected to the forward end of respective said rod and positioned adjacent the front side of the feed apparatus, each said control knob being selectively rotatable to rotate respective said pinion whereby respective said telescoping section is moved toward and away from said conveyor belt to vary the amount of feed ingredient being volumetrically metered therefrom and on said conveyor belt.

9. In a feed apparatus the combination comprising an elongated frame having opposite end portions, a pair of cylindrical conveyor rollers mounted to said frame adjacent respective said end portions thereof, an endless conveyor belt positioned around said conveyor rollers and having a generally horizontal upper run portion therebetween, reversible power means mounted to said frame for driving one said conveyor roller, selective means for driving said power means in a forward and a reverse direction whereby said conveyor belt is moved in a forward direction toward one said end portion and in a reverse direction toward said other end portion of said frame, a hammer mill mounted to said frame adjacent said one end portion, a roller mill mounted to said frame adjacent said other end portion, a plurality of hoppers in which various feed ingredients are disposed mounted to said frame above said conveyor belt, said hoppers terminating in discharge means adjacently above said conveyor belt, said discharge means including selective volumetric proportioning means for metering the various feed ingredients from respective hoppers onto said conveyor belt, a two-part funnel mounted to said frame adjacent the discharge end of said conveyor belt generally above said roller mill for directing a predetermined portion of the feed ingredients discharged from said conveyor belt through one part thereof and between the roller members of said roller mill and for by-passing oily feed concentrate through the other part of said funnel and around said roller members of said roller mill, said roller members grinding the predetermined portion of the feed ingredients, and reuniting said predetermined portion with the oily feed concentrate below said roller members of said roller mill, a funnel-like member mounted to said frame adjacent one said end portion thereof and extending between the discharge end of said conveyor belt adjacently above said hammer mill and said hammer mill, said hammer mill having a discharge opening through which ground and mixed finished feed may be removed, said discharge opening of said hammer mill constituting the discharge passage for finished feed from the feed apparatus, said roller mill having a discharge opening beneath said roller members, a power driven feed auger connecting said discharge opening of said roller mill to the discharge opening of said hammer mill for moving the mixed and ground feed from said roller mill to the discharge passage of the feed apparatus, said hammer mill being operative to grind feed ingredients received from said conveyor belt when said conveyor belt is moving in the forward direction, said roller mill and power auger being operative to grind and move finished feed to said discharge passage of the feed apparatus when said conveyor belt is moving in a reverse direction toward said other end portion.

10. In the feed apparatus as defined in claim 9 further comprising a separator member extending longitudinally of the upper run of said conveyor belt and closely adjacent thereto to maintain the oily feed concentrate separated and apart from the other feed ingredients on said conveyor belt, said separator member extending outwardly from the roller mill discharge end of said conveyor belt and directing feed concentrate on said conveyor belt into said other part of said funnel to by-pass same during operation of said roller mill

References Cited

UNITED STATES PATENTS

| | | | |
|---|---|---|---|
| 883,801 | 4/1908 | Harpstrite | 198—67 X |
| 1,364,168 | 1/1921 | Willford | 198—57 |
| 1,473,633 | 11/1923 | Lea | 198—57 |
| 1,942,855 | 1/1934 | Cooney | 241—301 X |
| 2,711,964 | 6/1955 | Wiemer | 99—236 |
| 3,190,571 | 6/1965 | Kimball | 241—101 X |

FOREIGN PATENTS

| | | |
|---|---|---|
| 541,042 | 5/1957 | Canada. |

WILLIAM W. DYER, Jr., *Primary Examiner.*

F. T. YOST, *Assistant Examiner.*